Nov. 30, 1954   W. B. PETERMAN   2,695,495
ADJUSTABLE RING-TYPE EXHAUST NOZZLE FOR JET ENGINES
Filed March 19, 1951   2 Sheets-Sheet 2

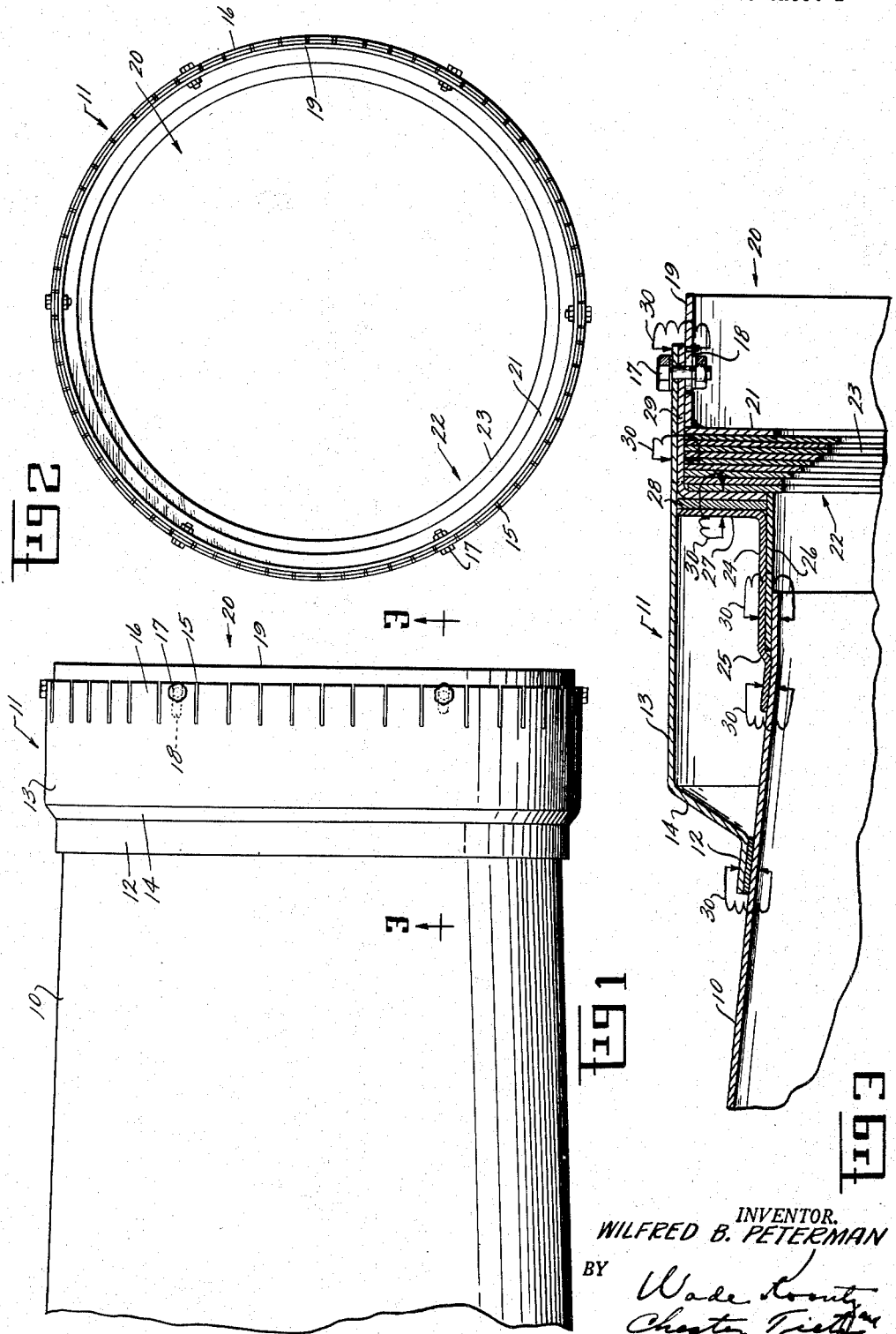

INVENTOR.
WILFRED B. PETERMAN
BY
ATTORNEYS

United States Patent Office 2,695,495
Patented Nov. 30, 1954

2,695,495

ADJUSTABLE RING-TYPE EXHAUST NOZZLE FOR JET ENGINES

Wilfred B. Peterman, Lancaster, Calif.

Application March 19, 1951, Serial No. 216,451

6 Claims. (Cl. 60—35.6)

(Granted under Title 35, U. S. Code (1952), sec. 266)

The invention described herein may be manufactured and used by or for the Government for governmental purposes without payment to me of any royalty thereon.

This invention relates to a ring-type exhaust nozzle for varying the cross sectional area of the outer end of the tail pipe of jet airplane engines.

One of the problems connected with turbo-jet engine installation has been the control of exhaust nozzle area for the purpose of obtaining optimum performance in flight. Production tolerances and clearance limits are of necessity sufficiently wide that there is a variation in performance between engines of the same type when employed with identical tail pipes and exhaust nozzles. Since it is impracticable to maintain a large supply of exhaust pipes with different nozzle areas in order to select the appropriate pipe for optimum performance with every engine that is installed in an aircraft, various ways of changing the exhause areas of jet engines have been brought forward. So far as is known, the only one which has attained any military or commercial use has been the system of adjustable tabs. This system provides two oblong tabs which project into the exhaust stream and which are angularly movable in and out toward the center of the exhaust stream. These tabs are objectionable in that they create much uncontrollable turbulence in the exhaust and cut down unnecessarily the maximum thrust which would be obtainable by the use of a nozzle having an uninterrupted circular cross section.

One object of the present invention is to provide a ring-type nozzle through the use of which the maximum amount of thrust is obtainable from a given jet engine.

Another object is to provide a ring-type nozzle which is radially adjustable to vary the exhaust area of a jet engine so that the optimum point may be easily selected and held.

Another object is to obtain a maximum thrust from a given jet engine by avoiding the waste of power due to the uncontrolled turbulence generated by the use of tabs.

Referring to the accompanying drawings:

Fig. 1 is a side elevation of the rear portion of a jet engine exhaust pipe showing my ring-type nozzle in place;

Fig. 2 is an end view of the same exhaust pipe showing the ring-type nozzle attached thereto;

Fig. 3 is a fragment of a cross section taken on the line 3—3 of Fig. 1 showing the detailed construction of a nozzle which is the subject of this invention. In this view the connected arrows indicate spot welding portions, the well existing between the arrows' tips;

Figure 4:
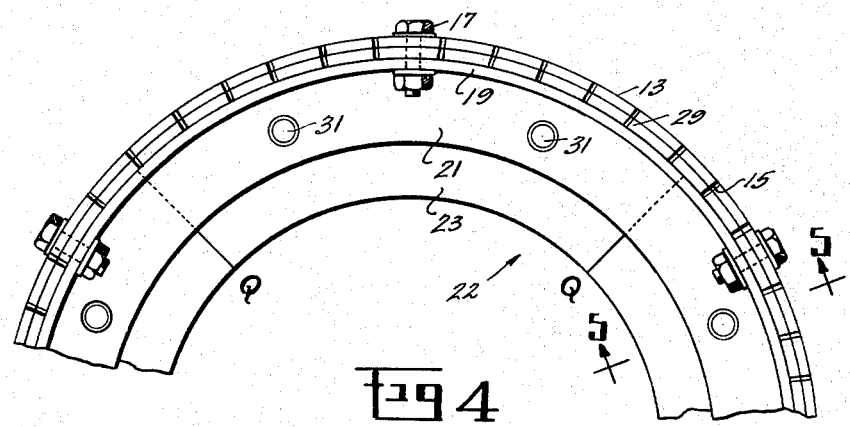
Fig. 4 is a fragmentary rear view of the exhaust pipe and nozzle showing a modification in which the nozzle rings are divided into segments for convenience and low expense of replacement.

In the figures, 10 is the outer end of a jet engine exhaust pipe which is of the jet type. Attached thereto by welding is a cylindrical flared housing 11, which is of two diameters 12 and 13, which are connected by a steeply slanted shoulder 14. The end of the cylindrical portion 13 slotted by a plurality of short slits 15 which divide the circumference into a multiplicity of fingers 16. The fingers 16 are preferably, but not necessarily, slightly bent inward to provide spring tension to other members which will be hereinafter described. At regular intervals about the circumference of cylinder 13, bolts 17 extend through larger slots 18 in certain of the cooperating members to be described. The bolts 17 also extend through a cylindrical portion 19 of a ring-retaining member 20 which includes an annular wall 21 which is intended to abut closely an assembly of substantially flat rings 22 of varying diameters of openings, these openings 23 decreasing in diameter from one ring to the other toward the outer extreme end of the tail pipe, i. e., the retaining or clamping member 20 by which the rings are clamped into a tight assembly. Fig. 3 shows this assembly in detail. The slots 18 are positioned in the periphery of the clamping member 20.

In order to prevent flutter of the cylindrical housing 13 and to provide a firm abutment against which the ring clamping member 20 may hold the rings 23 there is welded an angled stiffening member 24 to the outer end of the tail pipe 10. The angled stiffening member 24 is provided with a slight shoulder 25 for the accommodation and of a flat ring 26 which is wide enough to extend rearwardly beyond the upstanding portion 27 of the angled member 24. The upstanding portion 27 makes contact with the internal surface of the cylindrical flared portion 11. In this way a shoulder or firm bearing surface is provided for rings 22 and the support of the outer end 13 of the housing 11. This bearing surface is augmented by the provision of a flared ring 28 which is positioned between the upstanding portion 27 and an outer angled member 29 which extends from the outer tip of the ring 26 to the outer tip of the housing portion 13. Spot welds, which serve to strengthen the structure, are indicated by the use of the weld symbol and the reference numeral 30.

In Fig. 4 the rings 23 are divided into segments; in this case quadrants Q—Q. Each quadrant is positioned between the stiffening member 24 and the annular wall 21 by dowel pins 31 of which there are preferably two to a quadrant. Openings in the rings 23 and in the wall 21 are of course provided for the dowel pins 31.

Figure 5:
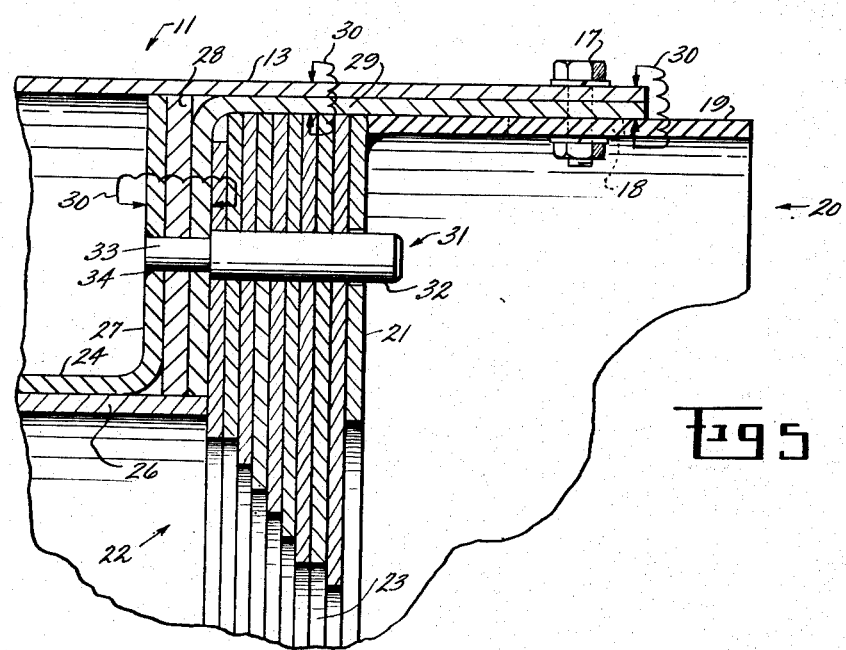
Fig. 5 is a fragmentary section taken on the line 5—5 of Fig. 4 and shows in detail the construction for holding the nozzle rings.

Fig. 5 shows that each dowel pin has a larger rearward diameter 32 and a smaller forward diameter 33. A weld 34 holds the smaller end of the pins 31 to the stiffening member 24, which has been drilled to receive it. In other respects, the assembly of Figs. 4 and 5 is identical with that of Figs. 2 and 3, to which they correspond. In the Fig. 4–5 construction, if one or more of the rings 23 are injured in any way, only the injured quadrants Q—Q need replacing. Since the rings 23 are made of high grade stainless steel, the saving due to the quadrant construction may be considerable.

*Operation*

In order to adjust the invention to its optimum performance, the engine and exhaust pipe as a unit are operated in either a static test stand or in an aircraft. When the engine is first operated, none of the rings should be present in the tail pipe, since the requirement as to the exact tail pipe area required for optimum performance is unknown. If it is a rated R. P. M. the exhaust temperature is below the optimum value concerned, a member of rings 23 will be inserted to raise the exhaust temperature by decreasing the nozzle area to a value which is near the desired limit. For each model the engine and its tail pipe combination, data will have been developed which will indicate the increment of temperature or decrease thereof which may be expected from the insertion or removal of each individual ring. Therefore, if after the initial operation of the engine, the temperature is seen to be at a certain value below that desired, the number of additional rings indicated by the differential temperature as being necessary will then be inserted. The engine should then be operated once more and a ring taken out or added as necessary to obtain the exact optimum temperature.

If the foregoing procedure is not followed, it is not only possible but probable that the engine or even the engine and the aircraft may be ruined by exceeding exhaust temperature limits before it is realized that the exhaust area is too small. The procedure therefore should be to alter the area of the exhaust opening from the least possible harmful condition to that condition which establishes maximum exhaust temperature allowed within safe operating limits.

When properly installed, this invention has resulted in the gain of 4.1% in range of certain types of jet aircraft.

What I claim is:

1. An adjustable exhaust nozzle for the tail pipe of a jet engine comprising a duct like extension means connected at one end to the tail pipe and having a step in the inner wall constituting an abutment means facing the other end thereof, a retaining means adjustably connected to said extension arranged parallel to and spaced from said abutment means and in conjunction therewith and said inner wall forming a channel therebetween and a series of ring members arranged within said channel clamped between said abutment means and said retaining means, said rings having successive decreasing internal diameters in the direction of said retaining means whereby the exhaust temperature may be varied by varying the number of rings successively employed.

2. In combination in an adjustable nozzle for the exhaust pipes of jet engines, an optional number of flat circular rings of aft progressively decreasing hole diameter, an abutment for said rings adjacent the end of the tail pipe, a cylindrical extension for said tail pipe supporting said abutment, a flared housing surrounding the abutment and the rings adjacent thereto and a clamping member of generally cylindrical shape having an annular flange adapted to abut the rings without decreasing their hole areas and bolt means extending radially through the flared housing, a portion of the abutment and the cylindrical portion of the clamping member.

3. An exhaust nozzle according to claim 2 in which the plurality of rings of decreasing hole size is formed in segments, at least two dowel pins of at least two diameters, the smallest diameter being permanently attached to the abutment, the largest diameter of the dowel pins projecting rearwardly, each ring and the clamping member being provided with an opening for the projection therethrough of the larger diameter of a dowel pin.

4. In an exhaust nozzle for a jet engine having a tail pipe, a substantially cylindrical housing attached to the outer end of said tail pipe and encircling said pipe, a cylindrical extension to said tail pipe at the outer end thereof, an optional number of stiffening rings attached to the inner surface of said housing at the outer end thereof, said stiffening rings serving to space the housing from the cylindrical extension and to stabilize both against flutter, a plurality of rings of progressively decreasing hole size in the aft direction but substantially identical outside diameter fitted within the cylindrical extension coaxially with the tail pipe and generally annular means attachable to the outer end of the housing for holding said rings against said stiffening rings in concentric relation with said tail pipe without obstructing the central openings of the rings.

5. An adjustable exhaust nozzle for the tail pipe of a jet engine comprising an annular extension connected at one end to the tail pipe and having a step in the inner wall forming an abutment means facing the other end thereof, an annular retaining member adjustably secured to said extension adjacent said other end thereof and arranged parallel to said abutment means and in conjunction with said wall and said abutment means forming an annular channel therebetween, and a series of ring members arranged within said channel clamped between said abutment means and said annular retaining member, said rings having successively decreasing internal diameters in the direction of said retaining member whereby the exhaust temperature may be varied by varying the number of rings successively employed.

6. The structure as set forth in claim 5 wherein the ring members are formed in segments and means releasably connecting the segments in contacting relation.

References Cited in the file of this patent

UNITED STATES PATENTS

| Number | Name | Date |
|---|---|---|
| 624,569 | Stover | May 9, 1899 |
| 1,609,894 | Trent | Dec. 7, 1926 |
| 1,671,617 | Spitzglass | May 29, 1928 |
| 2,496,351 | Mazzoni | Feb. 7, 1950 |
| 2,565,854 | Johnstone et al. | Aug. 28, 1951 |

FOREIGN PATENTS

| Number | Country | Date |
|---|---|---|
| 586,426 | France | Jan. 5, 1925 |